United States Patent
Fukuta

(10) Patent No.: US 8,587,871 B2
(45) Date of Patent: Nov. 19, 2013

(54) WAFER LENS AND METHOD FOR THE PRODUCTION THEREOF

(75) Inventor: Yasunari Fukuta, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 13/365,915

(22) Filed: Feb. 3, 2012

(65) Prior Publication Data

US 2012/0268829 A1    Oct. 25, 2012

Related U.S. Application Data

(62) Division of application No. 13/126,430, filed as application No. PCT/JP2009/065718 on Sep. 9, 2009.

(30) Foreign Application Priority Data

Oct. 31, 2008 (JP) ................................ 2008-282006

(51) Int. Cl.
*G02B 25/00* (2006.01)
(52) U.S. Cl.
USPC ........................................................ 359/642
(58) Field of Classification Search
USPC .................. 359/642, 645; 356/239.2; 264/1.7
See application file for complete search history.

(56) References Cited

U.S. PATENT DOCUMENTS

| | | | |
|---|---|---|---|
| 6,366,406 B1 | 4/2002 | Hamanaka et al. | |
| 2006/0044450 A1 | 3/2006 | Wolterink et al. | |
| 2006/0078246 A1 | 4/2006 | Ashida | |
| 2006/0262416 A1* | 11/2006 | Lee et al. | 359/645 |
| 2007/0275505 A1 | 11/2007 | Wolterink et al. | |
| 2008/0080048 A1 | 4/2008 | Saishu et al. | |
| 2008/0113273 A1* | 5/2008 | Jin et al. | 430/4 |
| 2008/0265448 A1 | 10/2008 | Ashida | |
| 2010/0046096 A1 | 2/2010 | Hirao et al. | |
| 2010/0091387 A1 | 4/2010 | Hirao et al. | |
| 2010/0134903 A1 | 6/2010 | Hirao et al. | |

(Continued)

FOREIGN PATENT DOCUMENTS

| | | |
|---|---|---|
| JP | 11-211902 | 8/1999 |
| JP | 2004-054229 | 2/2004 |

(Continued)

OTHER PUBLICATIONS

Dong-IK Shim et al, "Fabrication of phone-camera module using wafer-scale UV embossing process" 2006, SPIE-IS&T, vol. 6068, p. 60680Q1 to 60680Q8.*

(Continued)

*Primary Examiner* — Alessandro Amari
*Assistant Examiner* — Jie Lei
(74) *Attorney, Agent, or Firm* — Cozen O'Connor

(57) ABSTRACT

Disclosed is a wafer lens in which the warpage of a glass substrate included therein can be prevented. Specifically disclosed is a wafer lens comprising a glass substrate, a first resin part composed of a curable resin, and a second resin part composed of a curable resin. In each of the first resin part and the second resin part, two or more lens parts are formed. The volume of the resin of the first resin part after the cutting and the volume of the resin of the second resin part after the cutting satisfy the condition $0.6 \leq Vwa/Vwb \leq 2.1$, wherein "Vwa" indicates a volume of a resin on an object side and "Vwb" indicates a volume of a resin on an image side.

22 Claims, 9 Drawing Sheets

(56) References Cited

U.S. PATENT DOCUMENTS

| 2010/0134905 A1 | 6/2010 | Hirao et al. |
| 2010/0166413 A1 | 7/2010 | Hirao et al. |
| 2010/0188555 A1 | 7/2010 | Hirao et al. |
| 2010/0321794 A1 | 12/2010 | Hirao et al. |
| 2011/0001865 A1 | 1/2011 | Hirao et al. |
| 2011/0267709 A1 | 11/2011 | Hirao et al. |

FOREIGN PATENT DOCUMENTS

| JP | 2005-539276 | | 12/2005 | |
| JP | 2006-064758 | | 3/2006 | |
| JP | 2006-106229 | | 4/2006 | |
| JP | 2006-106479 | | 4/2006 | |
| JP | 2006106229 | * | 4/2006 | ............... G02B 3/00 |
| JP | 2006-233320 | | 9/2006 | |
| JP | 2006-284713 | | 10/2006 | |
| JP | 2006-323365 | | 11/2006 | |
| JP | 3929479 | | 6/2007 | |
| JP | 2008-089906 | | 4/2008 | |
| JP | 2008-155547 | | 7/2008 | |
| JP | 2008-233884 | | 10/2008 | |
| WO | WO 2004-027880 | | 4/2004 | |
| WO | WO 2008/102773 | | 8/2008 | |

OTHER PUBLICATIONS

English translation of JP 2006-106229, translated on Aug. 10, 2012.*
Office Action dated Feb. 27, 2013 issued by the Japanese Patent Office in the corresponding Japanese patent application No. 2011-168147.

* cited by examiner

WAFER LENS AND METHOD FOR THE PRODUCTION THEREOF

This is a division of application Ser. No. 13/126,430, filed Apr. 27, 2011, which is a U.S. National Phase under 35 U.S.C. §371 of International Application No. PCT/JP2009/065718, filed on Sep. 9, 2009, and claims the priority of Japanese application No. 2008-282006, filed on Oct. 31, 2008.

TECHNICAL FIELD

The present invention relates to a wafer lens and a manufacturing method thereof.

BACKGROUND

An image pickup device which is called a camera module has come to be mounted on a mobile terminal representing a compact and thin-type electronic hardware such as a cellular phone and PDA (Personal Digital Assistant), whereby, it has become possible to transmit mutually not only voice information but also image information to a remote location. As image pickup elements used for these image pickup devices, a solid-state imaging device such as a CCD type image sensor and a CMOS type image sensor are used. In recent years, increase of pixel numbers of the image pickup element have been advanced, and enhancement of its resolution and performance have been attained.

As a lens for image pickup which forms an image of a photographic object on the imaging pickup element, a lens made of resin, which is suitable for mass production with low cost has come to be used for cost reduction. In addition, the lens made of resin is excellent in terms of its workability and has satisfied requirements for enhancement of its performance, by being formed in an aspheric shape. With regard to an image pickup lens of this kind used for an image pickup device housed in a mobile terminal, a demand for the compatibility between further compactness and mass productivity required for the mobile terminals are strong and it is becoming difficult to meet the requirement by image pickup lenses structured by using only resin materials.

To solve these problems, there has been proposed a method to produce a large number of lenses for image pickup as follows. Plural lens parts made of curable resin are formed on a wafer shaped glass substrate in a size of several inches through a replica method (resin is formed into plural pieces in the lens shape on the glass substrate), and then the glass substrate is cut off into each separate lens part. Lenses manufactured by this method are called wafer lenses, and arts regarding pickup lenses of these types are disclosed in Patent Literatures 1 to 3.

PRIOR ART LITERATURE

Patent Literature

Patent Literature 1: Unexamined Japanese Patent Application Publication No. 2006-323365
Patent Literature 2: Japanese Patent No. 3929479
Patent Literature 3: International Publication No. WO 2008/102773 Pamphlet

SUMMARY OF THE INVENTION

Problems to be Solved by the Invention

In a wafer lens, however, resin is formed on a glass substrate and is cured by optical or thermal energy. The glass substrate is pulled toward the resin by shrinkage of the resin at the time of curing, and is warped toward either the obverse or reverse side.

To solve this problem, a major object of the present invention is to provide a wafer lens and method for the manufacturing the same, which realize the warpage of the glass substrate thereof being minimized.

Means for Solving the Problems

According to one aspect of the present invention, there is provided a wafer lens including: a glass substrate; a first resin part which is made of a curable resin and formed on one surface of the glass substrate; and a second resin part which is made of a curable resin and formed on another surface of the glass substrate, wherein one or a plurality of lens parts are formed on at least one of the first and the second resin parts, and a volume of the resin of the first resin part is equivalent to a volume of the resin of the second resin part.

According to another aspect of the present invention, there is provided a manufacturing method of a wafer lens including: a first step of forming a first resin part which is made of a curable resin, on one surface of a glass substrate; and a second step of forming a second resin part which is made of a curable resin, on another surface of the glass substrate, obtaining a wafer lens laminate which comprises a glass substrate and two resin layers having a plurality of lens parts through the formation of the first and the second resin parts, and cutting the wafer lens laminate and obtaining the wafer lens which has a single lens part formed within a range of an optically effective surface on each surface of the glass substrate and a non-lens part formed out of the range of the optically effective surface on at least one surface of the glass substrate, wherein the volume of the resin of the first resin part after the cutting and the volume of the resin of the second resin part after the cutting satisfy the expression $0.6 \leq Vwa/Vwb \leq 2.1$, wherein "Vwa" indicates a volume of a resin on an object side and "Vwb" indicates a volume of a resin on an image side.

Effects of the Invention

According to the present invention, the first and second resin parts are made of a curable resin having the same volume on one and the other surfaces of a glass substrate. This structure ensures that the deformation of the glass substrate caused by shrinkage of one resin part in the process of curing is offset by the deformation of the glass substrate caused by shrinkage of the other resin part in the process of curing, with the result that the warpage of the glass substrate is minimized.

BRIEF DESCRIPTION OF THE DRAWINGS

FIG. 1b is a cross sectional view along the line X in FIG. 1a.

FIG. 2b is a cross sectional view along the line Y in FIG. 2a.

Figure 2A:
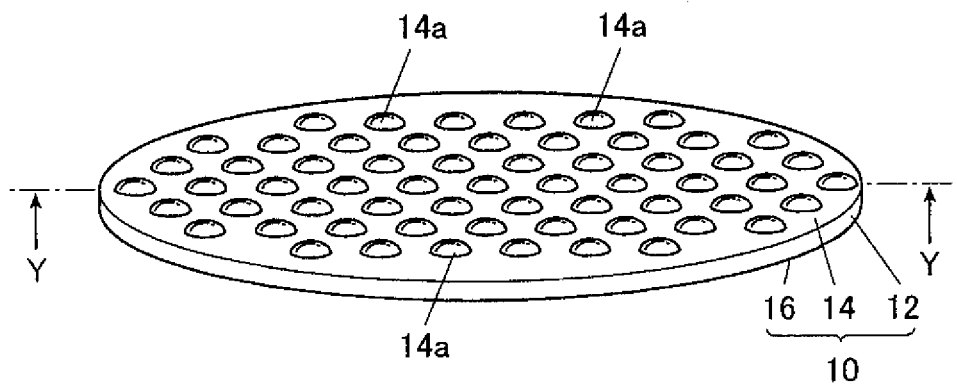
FIG. 2a is a perspective view representing a general configuration of a wafer lens in a preferred embodiment of the present invention.
Figure 2B:
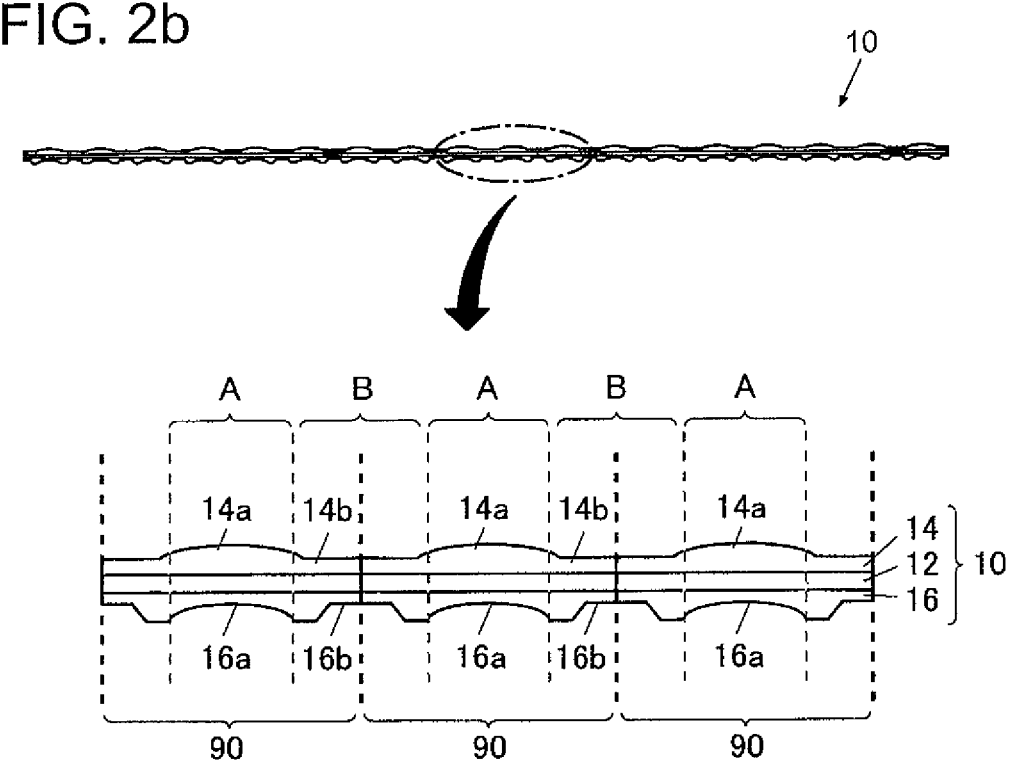
Figure 5A:
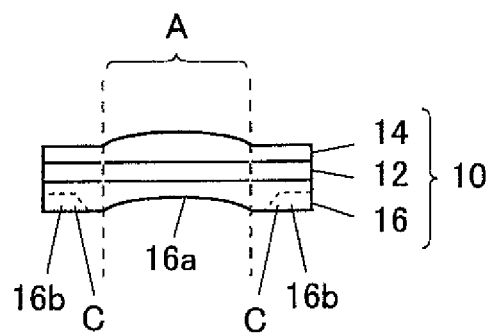
Figure 5B:
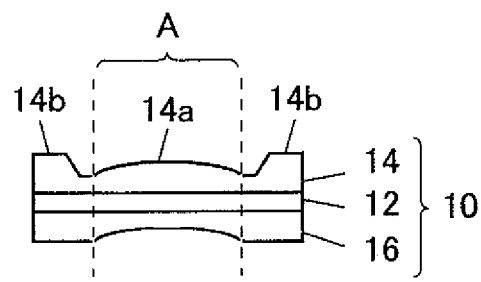
Figure 5C:
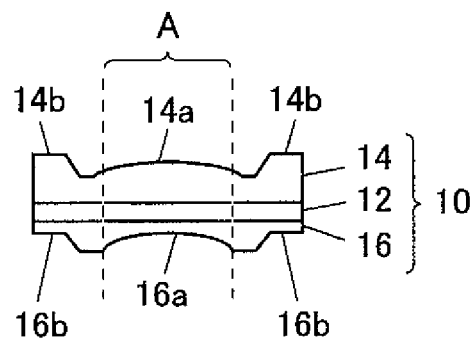

Each of FIGS. 5a, 5b and 5c is a cross sectional view showing a variation of the resin part in a wafer lens of FIGS. 2a and 2b.

Figure 6A:
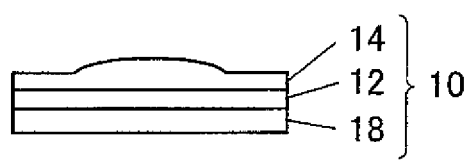
Figure 6B:
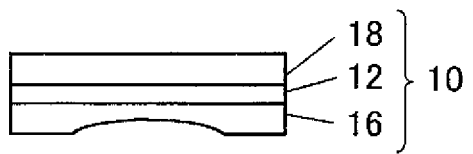

Each of FIGS. 6a and 6b is a cross sectional view showing a variation of the resin part in a wafer lens of FIGS. 2a and 2b.

Figure 7A:
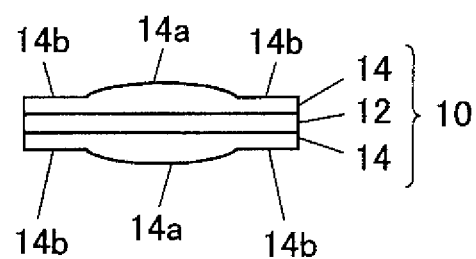
Figure 7B:
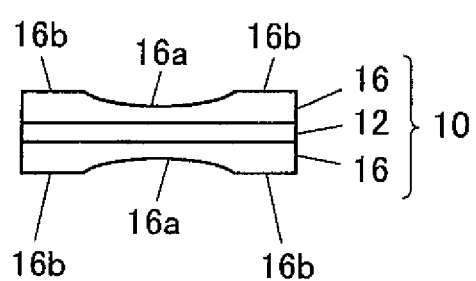

Each of FIGS. 7a and 7b is a cross sectional view showing a variation of the resin part in a wafer lens of FIGS. 2a and 2b.

Figure 8:
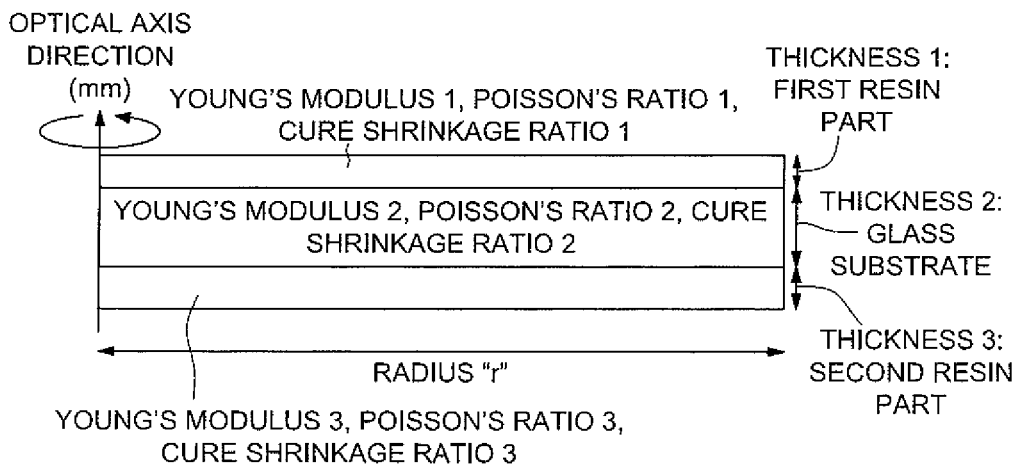
Figure 8:
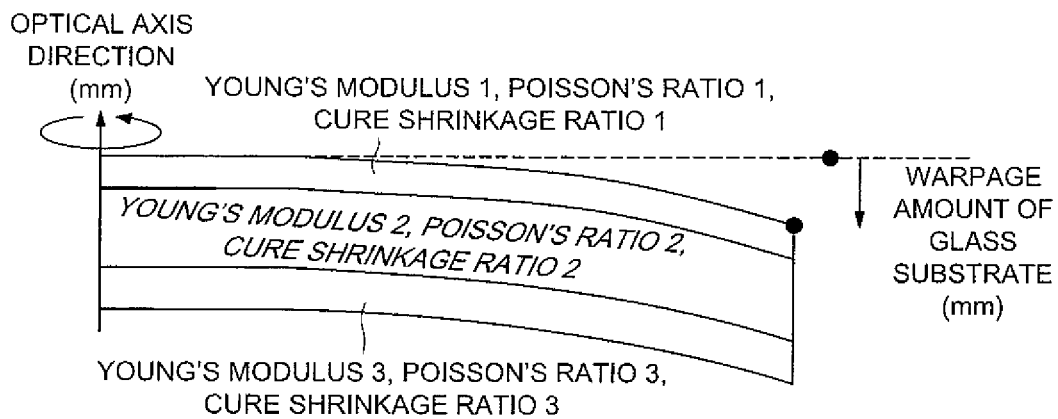

FIG. 8 is a general configuration representing a simulation model.

Figure 9:
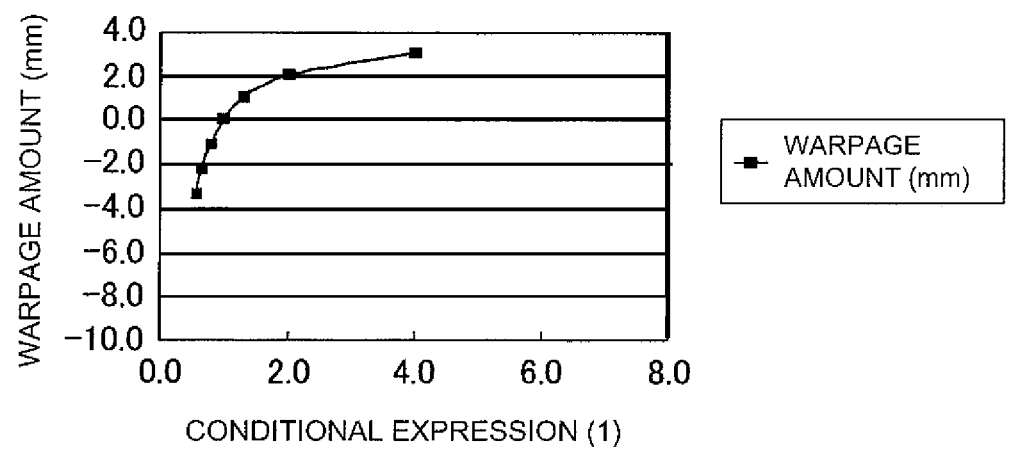

FIG. 9 is a schematic diagram showing the result of simulation in Expressions (1) and (3).

Figure 10:
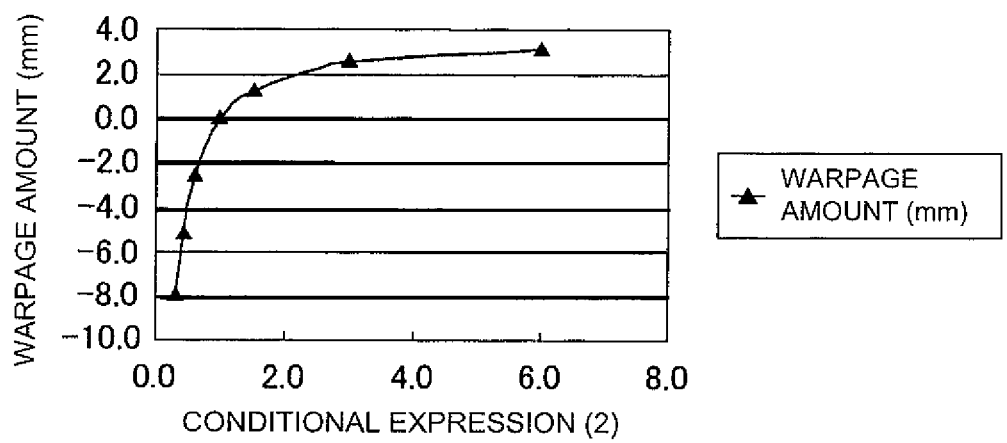

FIG. 10 is a schematic diagram showing the result of simulation in Expression (2).

DESCRIPTION OF THE EMBODIMENT

The following describes the preferred embodiments of the present invention with reference to drawings.

Figure 1A:
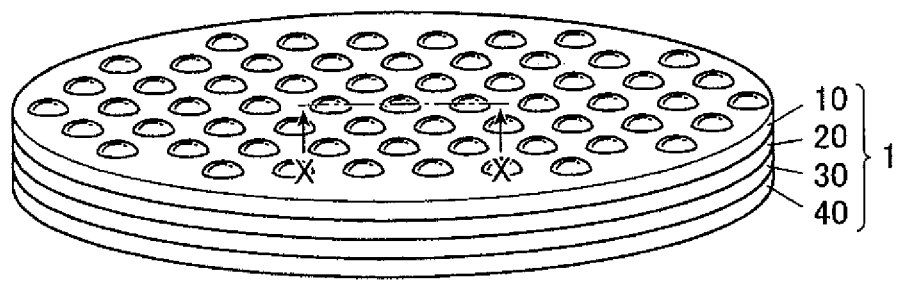
FIG. 1a is a perspective view representing a general configuration of a wafer lens laminate in a preferred embodiment of the present invention.
Figure 1B:
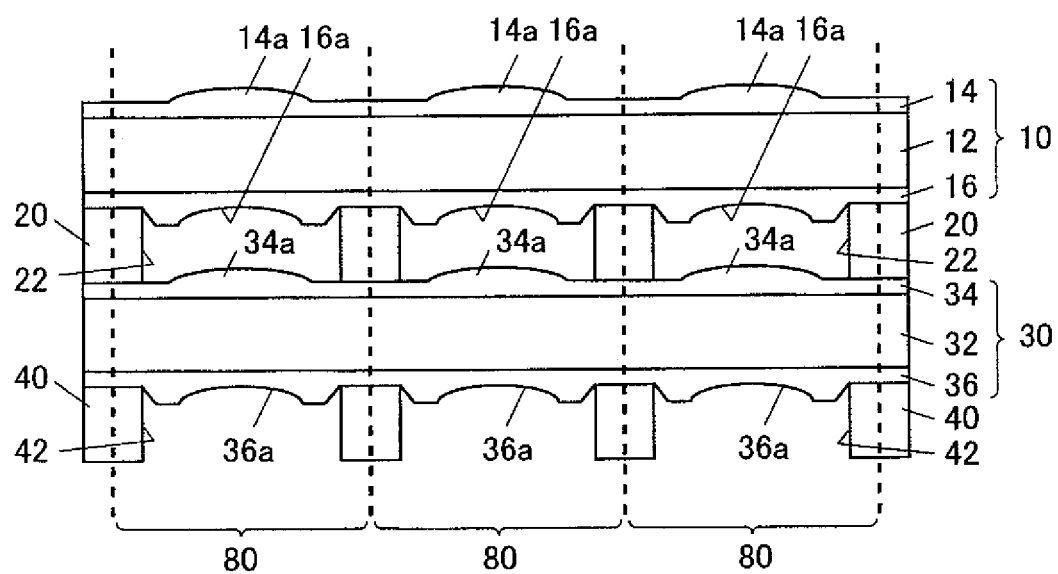

As shown in FIGS. 1a and 1b, a wafer lens laminate 1 as a preferred embodiment of the present invention includes two wafer lenses 10 and 30 and two spacers 20 and 40, which are laminated on one another. The spacer 20 is arranged between the wafer lenses 10 and 30, and the spacer 40 is arranged on the lower portion of the wafer lens 30. The wafer lenses 10 and 30 are the members similar to each other, and the spacers 20 and 40 are also the members similar to each other.

As shown in FIGS. 2a and 2b, the wafer lens 10 is provided with a disk-shaped glass substrate 12. A resin part 14 is formed on the upper portion of the glass substrate 12, and a resin part 16 is formed on the lower portion of the glass substrate 12. The resin parts 14 and 16 are made of a photocurable resin (e.g., acryl or epoxy based UV curable resin) or thermosetting resin. The resin constituting the resin part 14 can be the same as or different from the resin constituting the resin part 16.

The resin part 14 is provided with plural lens parts 14a. The lens parts 14a are protruded in an approximately hemispherical shape, and constitute a convex optical surface. The resin part 16 is provided with plural lens parts 16a. The lens parts 16a are recessed in an approximately hemispherical shape, and constitute a concave optical surface. The lens parts 14a and lens parts 16a are located to be opposed to each other so that there is agreement between each optical axis with respect to the optical surface of the lens parts 14a and one of lens parts 16a.

In the resin parts 14 and 16, lens parts 14a and 16a are formed in region A within the range of the optically effective surface, as shown in FIG. 2b. The region adjacent to the region A is the region B out of the range of the optically effective surface. Non-lens parts 14b and 16b are formed in the region B. The non-lens part 14b has a plane shape, while the non-lens part 16b has an uneven structure.

The volumes of the respective resins constituting the resin part 14 and constituting the resin part 16 are equivalent to each other. "The volumes of respective resins are equivalent to each other" means that the expression (3) is preferably satisfied, and expressions (3a) through (3c) are further preferably satisfied.

$$0.6 \leq Vwa/Vwb \leq 2.1 \tag{3}$$

$$0.6 \leq Vwa/Vwb \leq 1.9 \tag{3a}$$

$$0.75 \leq Vwa/Vwb \leq 1.4 \tag{3b}$$

$$0.75 \leq Vwa/Vwb \leq 1.3 \tag{3c}$$

In the expressions (3) through (3c), "Vwa" indicates the volume of the resin on the object side, while "Vwb" indicates the volume of the resin on the image side.

The volume of resin is measured by the following procedure.

(A) The surface shape is measured and the thicknesses of the resin as basic points are then measured. The measurements are then converted into volume.

(B) For example, the Panasonic's profilometer UA3P is used for measurement. The measuring instrument is not restricted to this type. Probe contact type and non-contact type measuring instruments can be used. A level difference meter is commonly used as the probe contact type. For example, the surface of a test piece is traced by a diamond chip having a sharp tip end mounted on the top of a cantilever, whereby the level difference between the surface of the glass substrate and resin surface is measured. In the non-contact type measuring method, a microscope can be used to inspect the difference of the focus position between the surface of the glass substrate and resin surface, or a microscope can be used to check the cross section of the lens.

In the present embodiment, preferably, the thicknesses of respective resins of the resin part 14 and resin part 16 meet the conditions of the expression (1). Further preferably, the thicknesses of respective resins of the resin part 14 and resin part 16 meet the conditions of the expressions (1a) through (1c).

$$0.6 \leq Twa/Twb \leq 2.1 \tag{1}$$

$$0.6 \leq Twa/Twb \leq 1.9 \tag{1a}$$

$$0.75 \leq Twa/Twb \leq 1.4 \tag{1b}$$

$$0.75 \leq Twa/Twb \leq 1.3 \tag{1c}$$

In the expressions (1) through (1c), "Twa" indicates the average thickness of the resin on the object side (resin part 14), whereas "Twb" indicates the average thickness of the resin on the image side (resin part 16).

The thickness of resin is measured by probe contact type and non-contact type measuring methods. A level difference meter is commonly used in the probe contact measuring method. For example, the surface of a test piece is traced by a diamond chip having a sharp tip end mounted on the top of a cantilever, whereby the level difference between the surface of the glass substrate and resin surface is measured. In the non-contact type measuring method, a microscope can be used to inspect the difference of the focus position between the surface of the glass substrate and resin surface, or a microscope can be used to check the cross section of the lens, whereby resin thickness is measured.

It is preferable if the volume cure shrinkage ratios of the respective resins of the resin part 14 and resin part 16 meet the conditions of expression (2), instead of or in addition to the conditions of expressions (1) through (1c). Further preferably the volume cure shrinkage ratios of the respective resins of the resin part 14 and resin part 16 meet the conditions of expressions (2a) through (2c).

$$0.6 \leq kwa/kwb \leq 3.0 \tag{2}$$

$$0.6 \leq kwa/kwb \leq 1.9 \tag{2a}$$

$$0.75 \leq kwa/kwb \leq 2.0 \tag{2b}$$

$$0.75 \leq kwa/kwb \leq 1.3 \tag{2c}$$

In the expressions (2) through (2c), "kwa" indicates the volume cure shrinkage ratio of the resin on the object side, while "kwb" indicates the volume cure shrinkage ratio of the resin on the image side.

Especially, the resin constituting the resin part 14 can be the same as or different from that constituting the resin part 16. However, the types of respective resins are different from each other, the conditions of the expressions (2) through (2c) are preferably met.

The conditions of expressions (1) through (1c) and (2) through (2c) are based on the result of simulation in the Example to be described later.

In the meantime, with regard to the resin part 14 and resin part 16, even though the thicknesses and volume cure shrinkage ratios of respective resins of the resin part 14 and resin part 16 do not meet the expressions (1) through (1c) and (2) through (2c), it is preferable if the areas coated with the resins of the resin part 14 and resin part 16 are equivalent to each other. The "area coated" indicates the areas of the resin part 14 and resin part 16 in the plane view of the wafer lens 10. Ups and downs (three-dimensional shape) resulting from the uneven structure of the resin part 14 and resin part 16 are not taken into account.

The spacer 20 is made up of an optically transparent material (e.g., heat resistant glass). As shown in FIG. 1b, a circular penetration hole 22 is formed on the spacer 20 at the positions corresponding to the lens part 16a and lens part 34a. The light having passed through the wafer lens 10 enters the wafer lens 30 without being interrupted by the spacer 20.

The following describes the method for manufacturing the wafer lens laminate 1 (including the method of manufacturing the wafer lenses 10 and 30) with reference to FIGS. 3a, 3b, 4a, 4b and 4c.

Figure 3A:
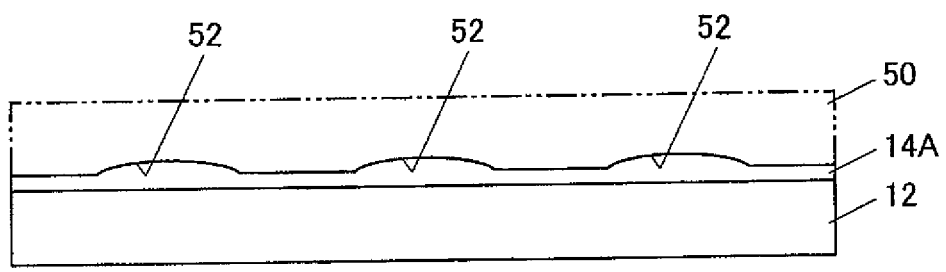
FIGS. 3a and 3b are diagrams schematically representing a method of manufacturing the wafer lens laminate of FIGS. 1a and 1b, to put it in more detail, schematically describing the method of manufacturing the wafer lens of FIGS. 2a and 2b.

As shown in FIG. 3a, the resin 14A in the monomer state (prior to curing) is placed (dripped or coated) on the surface of the glass substrate 12. A molding die 50 is pressed against the resin from above, and the cavity 52 is filled with resin 14A. After that, if the resin 14A is a photocurable resin, light is applied from above when the cavity 52 is filled with the resin 14A. In this case, an optically transparent die is used as the molding die 50.

As a result, the applied light passes through the molding die 50 and enters the resin 14A. The resin 14A is cured and the resin part 14 (plural lens parts 14a in particular) is formed on the glass substrate 12. If the resin 14A is a thermosetting resin, the molding die 50 is heated when the cavity 52 is filled with the resin 14A.

Figure 3B:
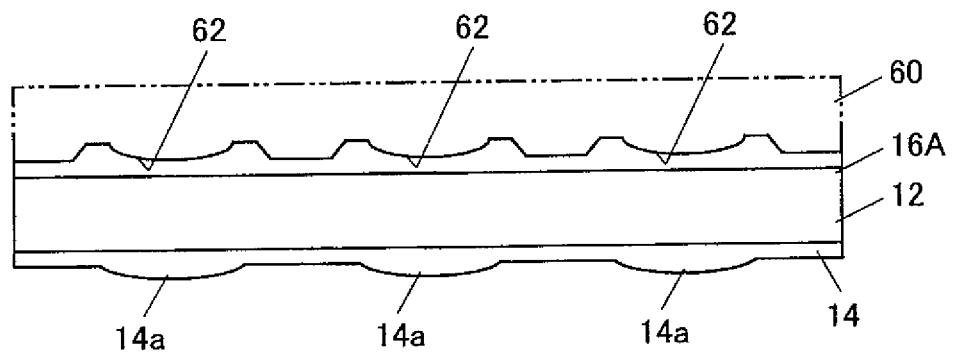

After that, the resin part 14 together with the glass substrate 12 is released from the molding die 50 and is reversed and then the resin part 16 is formed on the reverse side of the glass substrate 12. In this case, instead of the molding die 50 of FIG. 3a, the molding die 60 of FIG. 3b is used. When the cavity 62 of the molding die 60 is filled with resin 16A, the resin 16A is cured by application of light or heat so that the resin part 16 (plural lens parts 16a in particular) is formed.

Particularly when the resin part 16 is molded, the volume of the resin 16A is made equivalent to the amount of the resin 14A used (volume). It is preferred that the thicknesses and the volume cure shrinkage ratio of the resin 14A and resin 16A should be adjusted in such a way that the expressions (1) through (1c) and (2) through (2c) are satisfied by the resin part 14 and resin part 16. Alternatively, the areas coated with the resin 14A and resin 16A can be adjusted so that the coated areas of the resin part 14 and resin part 16 will be equivalent to each other.

After that, the resin part 16 together with the glass substrate 12 is released from the molding die 60, whereby the wafer lens 10 can be manufactured.

The wafer lens 30 can be manufactured using the same procedure as that for manufacturing the wafer lens 10.

Figure 4A:
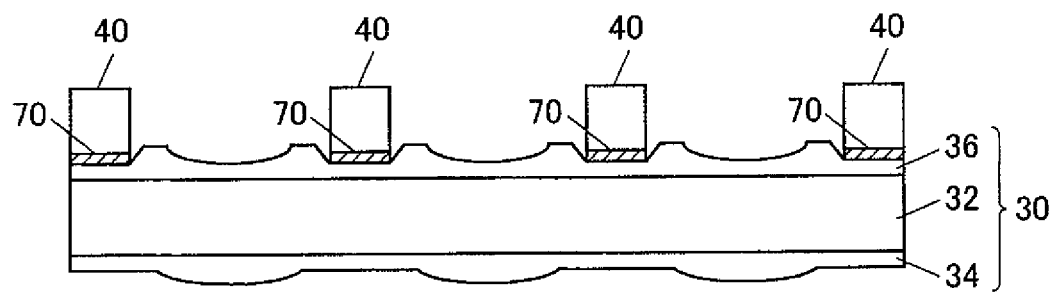
FIGS. 4a, 4b and 4c are diagrams schematically representing a method of manufacturing the wafer lens laminate of FIGS. 1a and 1b, to put it in more detail, schematically describing the steps of laminating wafer lenses on each other.

After that, as shown in FIG. 4a, the upper surface of the resin part 36 of the wafer lens 30 or the lower surface of the spacer 40 is coated with adhesive 70, and the spacer 40 is mounted on the wafer lens 30. The adhesive 70 is made of photocurable resin and is cured by light irradiation. (This applies to the adhesives 72 and 74 to be described later as well). After that, light is applied to the top of the spacer 40 to cure the adhesive 70, and the spacer 40 is fixed onto the wafer lens 30.

Figure 4B:
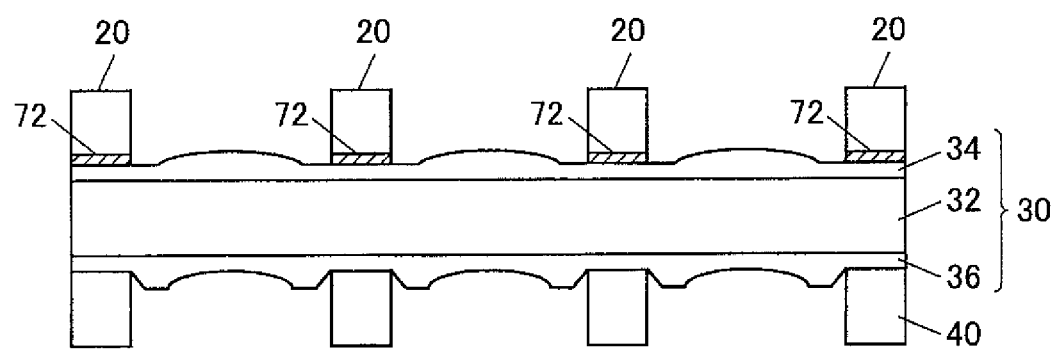

In the same procedure as that for fixing the spacer 40, the spacer 20 is fixed onto the resin part 34 of the wafer lens 30, as shown in FIG. 4b.

Figure 4C:
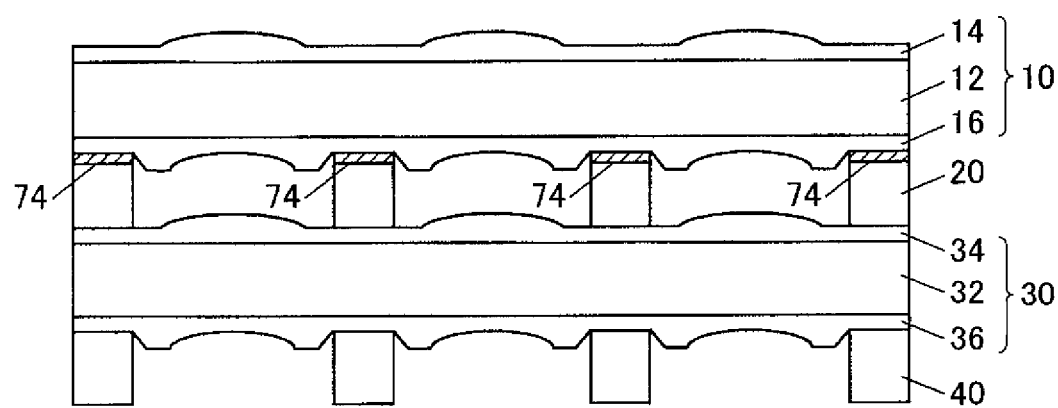

After that, as shown in FIG. 4c, the lower surface of the resin part 16 of the wafer lens 10 or the upper surface of the spacer 20 is coated with the adhesive 74. Then the wafer lens 10 is placed on the spacer 20. Then, light is applied to the top of the wafer lens 10 to cure the adhesive 74, and the wafer lens 10 is fixed onto the spacer 20. The wafer lens laminate 1 can be produced by the aforementioned procedures.

The wafer lens laminate 1 is preferably utilized as an image pickup lens of the imaging apparatus using such a solid pickup element as a CCD (Charge Coupled Device) type image sensor or CMOS (Complementary Metal Oxide Semiconductor) type image sensor. In this case, the wafer lens laminate 1 is cut off for each of the lens parts 14a, 16a, 34a and 36a, as shown in FIG. 1b. This cutoff fragment 80 is used as a wafer lens laminate and is incorporated into the imaging apparatus to be used as an image pickup lens.

Similarly, the wafer lens 10 itself can be used as an image pickup lens. In this case, the wafer lens 10 is cut off for each of the lens parts 14a and 16a, as shown in FIG. 2b. This cutoff fragment 90 is used as a wafer lens and is incorporated into the imaging apparatus to be used as an image pickup lens.

According to the aforementioned embodiment, when the wafer lens 10 is manufactured, the resins 14A and 16A having the same volume are used on the obverse and reverse sides of the glass substrate 12 to produce the lens parts 14a and 16a. This ensures, for example, that deformation of the glass substrate 12 resulting from the shrinkage of the resin 14A caused at the time of curing the resin 14A is offset by the deformation of the glass substrate 12 resulting from the shrinkage of the resin 16A caused at the time of curing the resin 16A, and the glass substrate 12 is prevented from being warped to either the obverse or reverse side. Further, since the amount (volume) of the resin 14A is the same as the amount (volume) of the resin 16A, this provides easy control of the amount of the resins 14A and 16A to be used.

In the resin parts 14 and 16, it is preferable that the volume cure shrinkage ratio of a resin having a smaller average value of the thickness is made greater than that of a resin having a greater average value of the thickness.

If there is a difference in the average value of the thickness between the resin parts 14 and 16, the glass substrate 12 is warped by being pulled by the resin having a greater average value of the thickness at the time of cure shrinkage. Accordingly the resin having a greater average value of the thickness is made to have a smaller volume cure shrinkage ratio among resin parts 14 and 16. This arrangement ensures that the deformation of the glass substrate 12 resulting from the cure shrinkage caused by the thickness of one of the resin parts 14 and 16 can be offset by the deformation of the glass substrate 12 resulting from the cure shrinkage caused by the volume cure shrinkage ratio of the other of the resin parts 14 and 16, whereby the warpage of the glass substrate 12 is minimized.

In the example of the wafer lens laminate 1 shown with reference to the present embodiment, the wafer lenses 10 and 30 are laminated as two layers. Similarly to the case of laminating the wafer lens 10 on the wafer lens 30 through the spacer 20, a wafer lens can be further laminated on the wafer lens 10 through a spacer 20. Thus, wafer lenses can be laminated as three or more layers as a whole.

In the example illustrated with reference to the wafer lens laminate 1 of the present embodiment, the wafer lens laminate 1 includes plural pieces of each of the lens parts 14a, 16a, 34a and 36a. The wafer lens laminate 1 can be designed to have each one of the lens parts 14a, 16a, 34a and 36a. (See the reference numeral 80 of FIG. 1b).

Similarly, the wafer lens 10 can be designed to have each one of lens parts 14a and 16a. (See the reference numeral 90 of FIG. 2b).

In such cases as well, the resin parts 14 and 16 (resin parts 34 and 36) are made of the same volume of the resin. The thickness and volume cure shrinkage ratio meet the requirements of the expressions (1) through (1c) and (2) through (2c), and the coating areas are equivalent to each other.

When the wafer lens laminate or the wafer lens is to be manufactured, the dies 50 and 60 each having one of the cavities 52 and 62 respectively can be used in the step of FIGS. 3a and 3b, and the spacers 20 and 40 having penetration holes 22 and 42 can be used in the step of FIGS. 4a through 4c. Other steps can be the same as those illustrated in FIGS. 3a, 3b, and 4a through 4c. However, in the production of this wafer lens laminate or wafer lens, plural pieces of each of the lens parts 14a, 16a, 34a and 36a are formed on the glass substrates 12 and 32 and are cut off for each of the lens parts 14a, 16a, 34a and 36a, as described above. This is better suited for high-volume production.

[Variation 1]

In the wafer lens 10 of FIGS. 1a, 1b, 2a and 2b, a so-called meniscus lens is formed by the resin parts 14 and 16 wherein the lens parts 14a and 16a are designed in a concavo-convex configuration. Instead of the shape shown in FIGS. 1a, 1b, 2a and 2b, however, the lens parts 14a and 16a can be designed to have the shape of FIGS. 5a through 5c (this also applies to the case of the wafer lens 30).

To be more specific, the non-lens part 16b can have simply a plane shape, as shown in FIG. 5a. Alternatively, the non-lens part 14b can be designed in an uneven structure, as shown in FIG. 5b. Alternatively, both the non-lens parts 14b and 16b can be made in an uneven configuration, as shown in FIG. 5c. The shape shown in FIGS. 5a through 5c allows the warpage of the glass substrate 12 to be minimized without deteriorating optical performances.

In contrast to the non-lens part 16b of FIG. 5a, the non-lens part 16b of FIG. 2b exhibits a large projected shape on the edge of the lens parts 16a, and a recessed shape is formed on the adjacent portion. Thus, in the non-lens parts 16b of FIG. 2b, the position of the spacer 20 to be placed (height position) can be ensured by the region C of the non-lens parts 16b of FIG. 5a enclosed by a broken line. The configuration of FIG. 2b is preferred in the production of the wafer lens laminate 1.

[Variation 2]

The resin part 18 devoid of optical power can be formed on any one of obverse and reverse sides of the glass substrate 12 as shown in FIGS. 6a and 6b, without a meniscus lens structure being designed as in the case of the wafer lens 10 of FIGS. 1a, 1b, 2a and 2b (this also applies to the case of the wafer lens 30). The resin part 18 can be designed to have a plane shape of coated resin on the glass substrate 12. In this case, forming the resin part 18 devoid of optical power is particularly effective in minimizing the warpage of the glass substrate 12, as compared to the case where the resin part 18 is not formed. In the design of the lens, the resin part 18 has no optical power, and therefore, the resin part can be easily mounted as a component of the wafer lens 10.

[Variation 3]

As shown in FIGS. 7a and 7b, the resin part 14 or 16 can be formed on both the obverse and reverse sides of the glass substrate 12, without a meniscus lens structure being designed as in the case of the wafer lens 10 of FIGS. 1a, 1b, 2a and 2b, (this also applies to the case of the wafer lens 30). Even when a convex or concave shape is formed on both the obverse and reverse sides of the glass substrate 12 like this, it is possible to ensure uniform tension of the glass substrate 12 from both sides and higher resistance to the warpage of the glass substrate 12, by changing the shape of surface other than the optical surface (non-lens parts 14b and 16b) against lack of uniformity resulting from the difference in the core thickness, the shape of the optical surface on the obverse and reverse sides of the glass substrate 12 and the cure shrinkage ratio of the resins 14A and 16A.

Example

In this Example, the structural analysis simulation is used to check warpage of the glass substrate.

In the first place, a model illustrated in FIG. 8 was created, and the parameters of each material were changed. The amount of change from the center (reference position) to the end point of the glass substrate is assumed as the warpage (mm) of the glass substrate. In this model, a wafer-shaped glass having a diameter of 200 mm is assumed as the glass substrate, and therefore radius r is 100 mm.

In the first resin part, Young's modulus 1 was 3,000 MPa, Poisson's ratio 1 was 0.33, and cure shrinkage ratio 1 and thickness 1 were as described in Tables 1 and 2.

In the glass substrate, Young's modulus 2 was 63,000 MPa, Poisson's ratio 2 was 0.20, cure shrinkage ratio 2 was 0.00, and thickness 2 was 1.00 mm.

In the third resin part, Young's modulus 3 was 3,000 MPa, Poisson's ratio 3 was 0.33, and the cure shrinkage ratio 3 and thickness 3 were as described in Tables 1 and 2.

The results are shown in Tables 1 and 2 and FIGS. 9 and 10.

TABLE 1

| Resin thickness 1 (mm) | Cure shrinkage ratio 1 | Resin thickness 3 (mm) | Cure shrinkage ratio 3 | Conditional expression (1) Conditional expression (3) | Warpage (mm) | Evaluation |
| --- | --- | --- | --- | --- | --- | --- |
| 0.20 | 0.03 | 0.05 | 0.03 | 4.00 | 3.03 | C |
| 0.20 | 0.03 | 0.10 | 0.03 | 2.00 | 2.07 | B |
| 0.20 | 0.03 | 0.15 | 0.03 | 1.33 | 1.06 | A |
| 0.20 | 0.03 | 0.20 | 0.03 | 1.00 | 0.00 | A |

TABLE 1-continued

| Resin thickness 1 (mm) | Cure shrinkage ratio 1 | Resin thickness 3 (mm) | Cure shrinkage ratio 3 | Conditional expression (1) Conditional expression (3) | Warpage (mm) | Evaluation |
|---|---|---|---|---|---|---|
| 0.20 | 0.03 | 0.25 | 0.03 | 0.80 | −1.09 | A |
| 0.20 | 0.03 | 0.30 | 0.03 | 0.67 | −2.22 | B |
| 0.20 | 0.03 | 0.35 | 0.03 | 0.57 | −3.36 | C |

TABLE 2

| Resin thickness 1 (mm) | Cure shrinkage ratio 1 | Resin thickness 3 (mm) | Cure shrinkage ratio 3 | Conditional expression (2) | Warpage (mm) | Evaluation |
|---|---|---|---|---|---|---|
| 0.20 | 0.03 | 0.20 | 0.005 | 6.00 | 3.16 | C |
| 0.20 | 0.03 | 0.20 | 0.010 | 3.00 | 2.54 | B |
| 0.20 | 0.03 | 0.20 | 0.020 | 1.50 | 1.27 | A |
| 0.20 | 0.03 | 0.20 | 0.030 | 1.00 | 0.00 | A |
| 0.20 | 0.03 | 0.20 | 0.050 | 0.60 | −2.57 | B |
| 0.20 | 0.03 | 0.20 | 0.070 | 0.43 | −5.17 | C |
| 0.20 | 0.03 | 0.20 | 0.090 | 0.33 | −7.81 | C |

The following describes the criteria for "A", "B" and "C" in Tables 1 and 2.

"A" indicates a smaller warpage of glass substrate, almost without any possibility of damage or impact on optical performances.

"B" indicates the greater warpage of glass substrate, with lower possibility of damage or impact on optical performances.

"C" indicates the greater warpage of glass substrate, with higher possibility of damage or impact on optical performances.

The conditions of the expressions (1) and (2) of the present embodiment, and the conditions of expressions (1a) through (1c) and (2a) through (2c) showing a preferred range have been determined based on the results.

The result of this simulation is based on the assumption that the glass substrate is in the state of a wafer. However, for the warpage of individual lenses, it is only required to assume the conditions where this wafer is cut off.

DESCRIPTION OF REFERENCE NUMERALS

1. Wafer lens laminate
10. Wafer lens
12. Glass substrate
14. Resin part
14a. Lens part
14b. Non-lens part
14A. Resin
16. Resin part
16a. Lens part
16b. Non-lens part
16A. Resin
18. Resin part
20. Spacer
22. Penetration hole
30. Wafer lens
32. Glass substrate
34. Resin part
34a. Lens part
34b. Non-lens part
34A. Resin
36. Resin part
36a. Lens part
36b. Non-lens part
36A. Resin
40. Spacer
42. Penetration hole
50. Molding die
52. Cavity
60. Molding die
62. Cavity
70, 72, 74. Adhesive
80, 90 Cutoff fragment
A. Region within the range of the optically effective surface
B. Region out of the range of the optically effective surface
C. Region (for ensuring spacer height position)

What is claimed is:

1. A wafer lens comprising:
a glass substrate;
a first resin part which is made of a curable resin and formed on one surface of the glass substrate; and
a second resin part which is made of a curable resin and formed on another surface of the glass substrate,
wherein each of the first and the second resin parts comprises a single lens part formed within a range of an optically effective surface and at least one of the first and the second resin parts comprises a non-lens part formed out of the range of the optically effective surface, said non-lens part having a different shape from the lens part,
wherein the single lens part is formed by cutting a wafer lens laminate, which comprises a glass substrate and two resin layers having a plurality of lens parts, into each lens part, and
wherein the shapes of the lens parts of the first resin part and the second resin part are different from each other, and
wherein a volume of the resin of the first resin part after the cutting and a volume of the resin of the second resin part after the cutting satisfy a condition of an expression (3), $$0.6 \leq Vwa/Vwb \leq 2.1 \quad (3)$$

wherein "Vwa" indicates a volume of a resin on an object side and "Vwb" indicates a volume of a resin on an image side.

2. The wafer lens of claim 1,
wherein the volume of the resin of the first resin part after the cutting and the volume of the resin of the second resin part after the cutting satisfy a condition of an expression (3a), $$0.6 \leq Vwa/Vwb \leq 1.9 \tag{3a}$$

wherein "Vwa" indicates the volume of the resin on the object side and "Vwb" indicates the volume of the resin on the image side.

3. The wafer lens of claim 1,
wherein the volume of the resin of the first resin part after the cutting and the volume of the resin of the second resin part after the cutting satisfy a condition of an expression (3b)

$$0.75 \leq Vwa/Vwb \leq 1.4 \tag{3b}$$

wherein "Vwa" indicates the volume of the resin on the object side and "Vwb" indicates the volume of the resin on the image side.

4. The wafer lens of claim 1,
wherein the volume of the resin of the first resin part after the cutting and the volume of the resin of the second resin part after the cutting satisfy a condition of an expression (3c), $$0.75 \leq Vwa/Vwb \leq 1.3 \tag{3c}$$

wherein "Vwa" indicates the volume of the resin on the object side and "Vwb" indicates the volume of the resin an the image side.

5. The wafer lens of claim 1,
wherein the non-lens part is formed on each of the first resin part and the second resin part, and
wherein the shapes of the non-lens parts of the first resin part and the second resin part are different from each other.

6. The wafer lens of claim 1,
wherein thicknesses of the resin of the first resin part after the cutting and the resin of the second resin part after the cutting satisfy a condition of an expression (1), $$0.6 \leq Twa/Twb \leq 2.1 \tag{1}$$

wherein "Twa" indicates an average thickness of a resin on an object side and "Twb" indicates an average thickness of a resin on an image side.

7. The wafer lens of claim 1,
wherein volume cure shrinkages of the resin of the first resin part after the cutting and the resin of the second resin part after the cutting satisfy a condition of an expression (2), $$0.6 \leq kwa/kwb \leq 3.0 \tag{2}$$

wherein "kwa" indicates a volume cure shrinkage of a resin on an object side and "kwb" indicates a volume cure shrinkage of a resin on an image side.

8. The wafer lens of claim 7,
wherein the average thickness of the first resin part is same as the average thickness of the second resin part.

9. The wafer lens of claim 1,
wherein the first resin part and the second resin part have different average thickness from each other, and a volume cure shrinkage of one of the first and second resin parts after the cutting having a smaller average thickness than an average thickness of another resin part is greater than a volume cure shrinkage of the other of the first and second resin parts after the cutting.

10. The wafer lens of claim 1,
wherein an area after the cutting on which the resin of the first resin part is applied and an area after the cutting on which the resin of the second resin part is applied are equivalent to each other.

11. The wafer lens of claim 1,
wherein the single lens part is formed on each of the first resin part and the second resin part, and
wherein one of the lens parts of the first resin part and the lens part of the second resin part is formed in a convex shape and another thereof is formed in a concave shape.

12. The wafer lens of claim 1,
wherein the non-lens part is formed on each of the first resin part and the second resin part, and
wherein at least one of the non-lens parts of the first resin part and the non-lens part of the second resin part is formed in a projected shape or in a recessed shape.

13. The wafer lens of claim 1,
wherein the single lens part is formed on each of the first resin part and the second resin part, and
wherein one of the lens parts of the first resin part and the lens part of the second resin part is formed in one of a convex shape and a concave shape and another thereof is formed in a plane shape.

14. The wafer lens of claim 1,
wherein the curable resin of the first resin part is same as the curable resin of the curable resin of the second resin part.

15. A manufacturing method of a wafer lens comprising:
forming a first resin part which is made of a curable resin, on one surface of a glass substrate; and
forming a second resin part which is made of a curable resin, on another surface of the glass substrate,
obtaining a wafer lens laminate which comprises a glass substrate and two resin layers having a plurality of lens parts through the formation of the first and the second resin parts, and
cutting the wafer lens laminate into each lens part, and obtaining the wafer lens which has a single lens part formed within a range of an optically effective surface on each surface of the glass substrate and a non-lens part formed out of the range of the optically effective surface on at least one surface of the glass substrate,
wherein, a volume of the resin of the first resin part after the cutting and a volume of the resin of the second resin part after the cutting satisfy a condition of an expression (3).

$$0.6 \leq Vwa/Vwb \leq 2.1 \tag{3}$$

wherein "Vwa" indicates a volume of a resin on an object side and "Vwb" indicates a volume of a resin on an image side.

16. The manufacturing method of a wafer lens of claim 15,
wherein, the volume of the resin of the first resin part after the cutting and the volume of the resin of the second resin part after the cutting satisfy a condition of an expression (3a), $$0.6 \leq Vwa/Vwb \leq 1.9 \tag{3a}$$

wherein "Vwa" indicates the volume of the resin on the object side and "Vwb" indicates the volume of the resin on the image side.

17. The manufacturing method of a wafer lens of claim 15,
wherein, the volume of the resin of the first resin part after the cutting and the volume of the resin of the second resin part after the cutting satisfy a condition of an expression (3b), $$0.75 \leq Vwa/Vwb \leq 1.4 \tag{3b}$$

wherein "Vwa" indicates the volume of the resin on the object side and "Vwb" indicates the volume of the resin on the image side.

18. The manufacturing method of a wafer lens of claim 15, wherein, the volume of the resin of the first resin part after the cutting and the volume of the resin of the second resin part after the cutting satisfy a condition of an expression (3c), $$0.75 \leq Vwa/Vwb \leq 1.9 \tag{3c}$$

wherein "Vwa" indicates the volume of the resin on the object side and "Vwb" indicates the volume of the resin on the image side.

19. The manufacturing method of a wafer lens of claim 15, wherein volume cure shrinkages of the resin of the first resin part after the cutting and the resin, of the second resin part after the cutting satisfy a condition of an expression (2), $$0.6 \leq kwa/kwb \leq 3.0 \tag{2}$$

wherein "kwa" indicates a volume cure shrinkage of a resin on an object side and "kwb" indicates a volume cure shrinkage of a resin on an image side.

20. The manufacturing method of a wafer lens of claim 19, wherein the average thickness of the first resin part is same as the average thickness of the second resin part.

21. The manufacturing method of a wafer lens of claim 15, wherein the curable resin of the first resin part is same as the curable resin of the curable resin of the second resin part.

22. The manufacturing method of a wafer lens of claim 15, wherein thicknesses of the resin of the first resin part after the cutting and the resin of the second resin part after the cutting satisfy a condition of an expression (1), $$0.6 \leq Twa/Twb \leq 2.1 \tag{1}$$

wherein "Twa" indicates an average thickness of a resin on an object side and "Twb" indicates an average thickness of a resin on an image side.

* * * * *